United States Patent [19]

Munakata

[11] 3,843,966

[45] Oct. 22, 1974

[54] MAGNETIC TAPE RECORDING AND REPRODUCING APPARATUS

[75] Inventor: Yukio Munakata, Tokyo, Japan

[73] Assignee: Pioneer Electronics Corporation, Tokyo, Japan

[22] Filed: June 28, 1971

[21] Appl. No.: 157,577

[30] Foreign Application Priority Data

June 27, 1970 Japan .............................. 45-56265

[52] U.S. Cl. .............................................. 360/74

[51] Int. Cl. .......................................... G11b 15/32

[58] Field of Search .......... 274/4 R, 4 D, 4 C, 11 R, 274/11 C; 242/198–200, 206, 186, 188, 191, 192, 57

[56] References Cited

UNITED STATES PATENTS

| | | | |
|---|---|---|---|
| 3,146,316 | 8/1964 | Knoth | 242/198 |
| 3,480,230 | 11/1969 | Hosono et al. | 242/57 |
| 3,488,017 | 1/1970 | Schatteman | 242/57 |
| 3,533,633 | 10/1970 | Wilder | 274/4 D |
| 3,606,202 | 9/1971 | Williams et al. | 242/202 |
| 3,642,226 | 2/1972 | Tokunaga | 242/57 |
| 3,647,989 | 3/1972 | Mattas | 179/100.2 MD |
| 3,661,396 | 5/1972 | Sterly | 274/4 D |
| 3,664,672 | 5/1972 | Fujikawa et al. | 274/4 D |
| 3,711,657 | 1/1973 | Niioka | 179/100.2 MD |

*Primary Examiner*—Harry N. Haroian
*Attorney, Agent, or Firm*—Sughrue, Rothwell, Mion, Zinn & Macpeak

[57] ABSTRACT

A magnetic recording and reproducing apparatus, comprising a starting switch, a tape end detection device, a switching device for reversing the tape feeding direction, a tape fast feeding operating device, and a single plunger actuated in response to the energization of any of these switches or devices so as to initiate the recording or the reproducing operation, and automatic inversion, the switching of the direction of the recording or the reproducing, and the release of the fast feeding operation.

9 Claims, 5 Drawing Figures

MAGNETIC TAPE RECORDING AND REPRODUCING APPARATUS

BACKGROUND OF THE INVENTION

The present invention relates to a magnetic tape recording and reproducing apparatus having a simple construction, capable of performing various functions and being readily operable.

In the conventional magnetic tape recording and reproducing apparatus, in particular, in magnetic tape recording and reproducing apparatus having various functions such as reciprocal recording or reproducing functions, automatic reversing function and rapid winding function, etc., there have been provided many advantages in use, and thus they have been used widely. In realizing these functions, however, complex mechanisms have generally been required and consequently a variety of problems inherent to such mechanisms have been experienced. Further, in using such apparatus, since there have occurred some problems concerning their use in that complicated operations must be performed repeatedly, it has been very difficult to provide the above mentioned functions in such as a carstereo device which is subjected to limitations in space to be occupied thereby, and the like.

SUMMARY OF THE INVENTION

A primary object of the present invention, developed by consideration of the above mentioned various problems, is to provide a magnetic tape recording and reproducing apparatus characterized in that a switching operation of reversing the direction of the recording or the reproducing, an automatic reversing operation and an operation for returning automatically to the recording or reproducing speed after a rapid feeding, etc. are performed by a single plunger.

Another object of the present invention is to provide a magnetic tape recording and reproducing apparatus characterized by release means such as a time constant circuit or the like for demagnetizing the plunger which is operable in response to a termination of the rapid feeding operation to be performed by a detection of the end of the tape being rapidly fed.

A further object of the present invention is to provide a magnetic tape recording and reproducing apparatus characterized in that a switching operation for reversing the direction of the recording or reproducing and a rapid feeding operation are performed by a common operating button.

A still further object of the present invention is to provide a magnetic tape recording and reproducing apparatus having a simple construction and being readily operable.

BRIEF DESCRIPTION OF THE DRAWINGS

Other objects and features of the present invention will become clear from the following description of a preferred embodiment constructed in accordance with the present invention with reference to the drawings, in which.

DESCRIPTION OF THE PREFERRED EMBODIMENT

Figure 1:
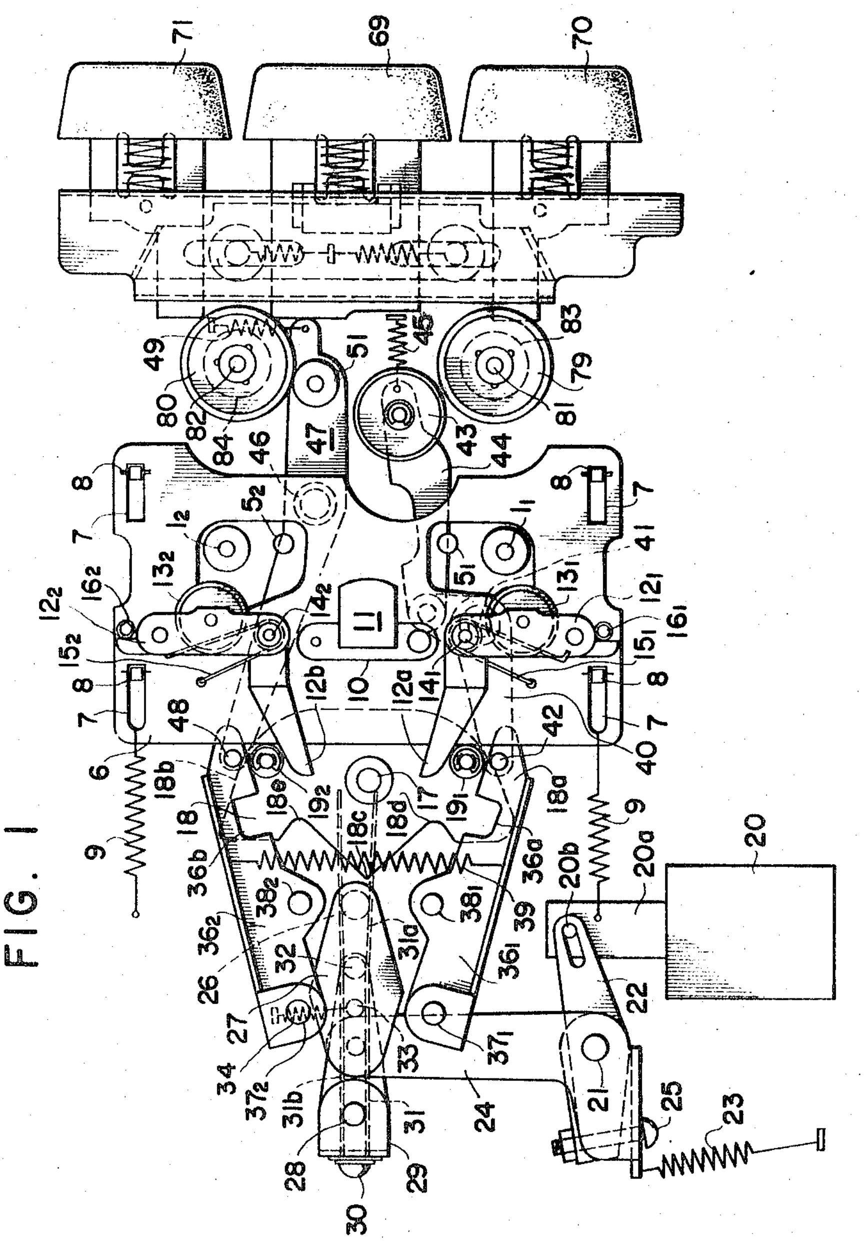
FIG. 1 is a plan view of the present apparatus in the disabled condition.

As shown in the drawings, capstans $1_1$ and $1_2$ are coupled with rotation axes of flywheels $2_1$ and $2_2$, respectively, and rotational power is transmitted from a pulley 3 mounted on a rotational shaft of an electric motor for rotation therewith through a belt 4 to the flywheels in such a way that the flywheels are rotated in opposite directions. Secured on a chassis (not shown) are pins $5_1$ and $5_2$ for supporting a tape cartridge of the "reel-to-reel" type. A shiftable base plate 6 having four guide grooves 7 and four rollers 8, each pair at one of the four corners thereof, is shiftable for forward and rearward movement and is normally biased rearwardly by springs 9.

On a holding member 10 provided on the shiftable base plate 6, a magnetic head 11 is fixedly disposed, and on holding frames $12_1$ and $12_2$ provided on the plate 6, pinch rollers $13_1$ and $13_2$ are rotatably fixed respectively. The holding frames $12_1$ and $12_2$ are supported rotatably on shafts $14_1$ and $14_2$ respectively and biased toward the capstans $1_1$ and $1_2$ by springs $15_1$ and $15_2$ provided on the shafts $14_1$ and $14_2$ to contact therewith. Depicted by numerals $16_1$ and $16_2$ are stoppers to restrict the rotational movement of the frames $12_1$ and $12_2$. The holding frames $12_1$ and $12_2$ have rearwardly extending operation ends 12a and 12b, and the ends *12a* and *12b* are biased by the springs 15 and $15_2$ to contact with pins $19_1$ and $19_2$ provided on a cam plate 18 rotatably carried on a rotational shaft 17. When the present tape recorder is in the non-operating state as shown in FIG. 1, the pins $19_1$ and $19_2$ on the cam plate 18 are engaged with the operation ends *12a* and *12b* of the holding frames $12_1$ and $12_2$ which hold the pinch rollers $13_1$ and $13_2$ respectively and are engaged with the shiftable plate 6 by the action of the springs 9.

The cam plate 18 is provided with cam surfaces *18a* and *18b* on its opposite sides which surfaces are eccentric with respect to the rotational shaft 17, that is, partially circular, the center being behind the rotational shaft 17, and provided rearwardly with two cam valleys *18d* and *18e* between which a peak portion *18c* is provided. A plunger 20 adapted to rotate the cam plate 18 and a shift shaft *20a*. One end of a lever 22 pivotably mounted on a shaft 21 is connected with the shaft *20a* by a pin *20b* provided on the shaft *20a*. The other end of the lever 22 is connected with a lever 24 by a screw 25. The lever 24 is supported rotatably by the shaft 21 and is biased by a spring 23 to urge it in a counterclockwise direction. On the other end of the lever 24, a cam lever 27 is pivotably supported which lever has a pin 26 at the remote end thereof from the connection of the lever 24 which pin is adapted to enter the valleys of the cam plate 18. The pin 26 is pinched between extensions *31a* and *31b* extending in parallel from a wire spring 31 secured by a screw 30 to a spring holding lever 29 pivotably mounted on a shaft 28. A pin 32 is disposed on the spring holding lever 29 and is adapted to prevent excessive deformation of the extensions *31a* and *31b* of the wire spring 31, and a pin 33 is also fixed on the lever 29 and serves to bias the spring holding lever 29 in a counterclockwise direction by a spring 34 provided between it and the chassis.

Further, the pin 33 contacts with a slope portion 35a of a shift lever 35 which will be described hereinafter, so that in the non-operating state (FIG. 1 and FIG. 2) the shaft 28, the pin 33, the pin 32 and the pin 26 are aligned in a substantially straight line. However, the pivot shaft 17 of the cam plate 18 is shifted toward the plunger 20 so that when the pin 26 is shifted from this position along the wire spring 31, the pin 26 always enters into the valley 18*e*. Arms $36_1$ and $36_2$ are pivotably mounted on shafts $37_1$ and $37_2$ respectively, and the arm $36_1$ is provided with a pin $38_1$ and a recess $36_a$ adapted to engage with the pin $19_1$ on the cam plate 18 and the arm $36_2$ is similarly provided with a pin $38_2$ and a recess 36*b* adapted to engage with a pin $19_2$ on the cam plate 18, the both arms being pulled by a spring 39 in a direction toward each other.

A pin 42 provided at one end of an L-shaped lever 40 pivotably mounted on a shaft 41, as shown in FIG. 1, contacts the cam surface 18*a* of the cam plate 18 by a forward pulling action of a spring 45 of a pulling lever 44 connected at one end with the lever 40 and having at the other end an idler 43 and the spring 45. Similarly, a pin 48 provided on one end of a driving lever 47 pivotably mounted on a shaft 46 is forced against the cam surface 18b by a spring 49 attached to the other end of the driving lever. A pulley 50 and an idler 51 rotated therewith are pivotably mounted on the front end of the lever 47, and the pulley and the idler are driven by a rotational force transmitted from the flywheel $2_2$ through a belt 52. A slide lever 53 for fast forward winding and a slide lever 54 for fast rewinding are carried in such a way that they can move to and fro and are biased by springs $55_1$ and $55_2$, respectively.

The lever 53 has a cam portion 53*a* and a protrusion 53*b*, and the lever 54 has a cam portion 54*a* and a protrusion 54*b*. Levers $58_1$ and $58_2$, pivotably supporting levers $57_1$ and $57_2$, respectively, are mounted pivotably on shafts $60_1$ and $60_2$, and have protrusions 58*a* and 58*b* for restricting the pivotal movements of the levers $57_1$ and $57_2$, respectively. One end of the levers $57_1$ and $57_2$ support idlers $56_1$ and $56_2$, respectively, and contact with the cam portions 53*a* and 54*a* under the influence of springs $59_1$ and $59_2$ provided between the slide levers 53 and 54 and levers $58_1$ and $58_2$ pivotably supporting the other ends of the levers $57_1$ and $57_2$ respectively. A pin 61 is provided on the rear end of the slide lever 54 for rewinding, and the pin 61 engages with a slot provided on one end of a connecting lever 62 pivotably mounted on the shaft 63 and having a hole on the other end into which one end of the shift lever 35 enters and engages. The pin 33 on the spring holding lever 29 in contact with the slope portion 35*a* of the shift lever 35 by the spring 34, is contacted with a step portion 66*a* of a locking lever 66 mounted pivotably on the shaft 64 by a spring 65. Further, the locking lever 66 has a recess 66*b* on a portion thereof following the step portion 66*a* which is adapted to engage with the pin 33 when the shift lever 35 is shifted, portion thereof following the step portion 66*a* and the other end 66*c* is in a position where it engages with the shift shaft 20*a* of the plunger 20.

A release lever 67, whose width is substantially equal to the distance between the pins $38_1$ and $38_2$ of the arms $36_1$ and $36_2$ in the nonoperating state, has recesses 67*a* and 67*b* on the rear portion thereof which normally do not restrict the pivotal movements of the arms $36_1$ and $36_2$, and is drawn forwardly by a spring 68. The release lever 67 is further provided with wing portions 67*d* and 67*c* engaging, respectively, with protrusions 53*b* and 54*b* of the slide levers 53 and 54. An eject button 69, a forward feeding button 70, and a reverse feeding button 71 are guided and supported by a holding plate 72 respectively and urged forwardly by springs 73*a*, 73*b* and 73*c* inserted respectively into H-shape recesses thereof. A detent member 74 and stoppers 75*a* and 75*b* contact with the holding plate 72. In addition, the respective buttons 69, 70 and 71 contact with the front end portions of the release lever 67 biased by the spring 68, the slide lever 53 for fast forward rewinding biased by the spring $55_1$, and the slide lever 54 for fast rewinding biased by the spring $55_2$.

The detent 74 of the eject button 69 may operate a release mechanism of a tape cartridge (not shown) when the button 69 is depressed. The slide lever 76 is slidably supported by the holding plate 72 for movement in a lateral direction and has inclined portions on the opposite ends thereof with which the stoppers 75*a* and 75*b* of the buttons 70 and 71 are engaged so that it is impossible to depress the two buttons at one time. The position of the slide lever 76 is maintained at the center position by the springs 77 and 78. Reel shafts 81 and 82, adapted to be inserted into and engaged with reels disposed in the tape-cartridge, are connected frictionally with reel stages 79 and 80, respectively, and are secured to pulleys 83 and 84, respectively.

Figure 2:
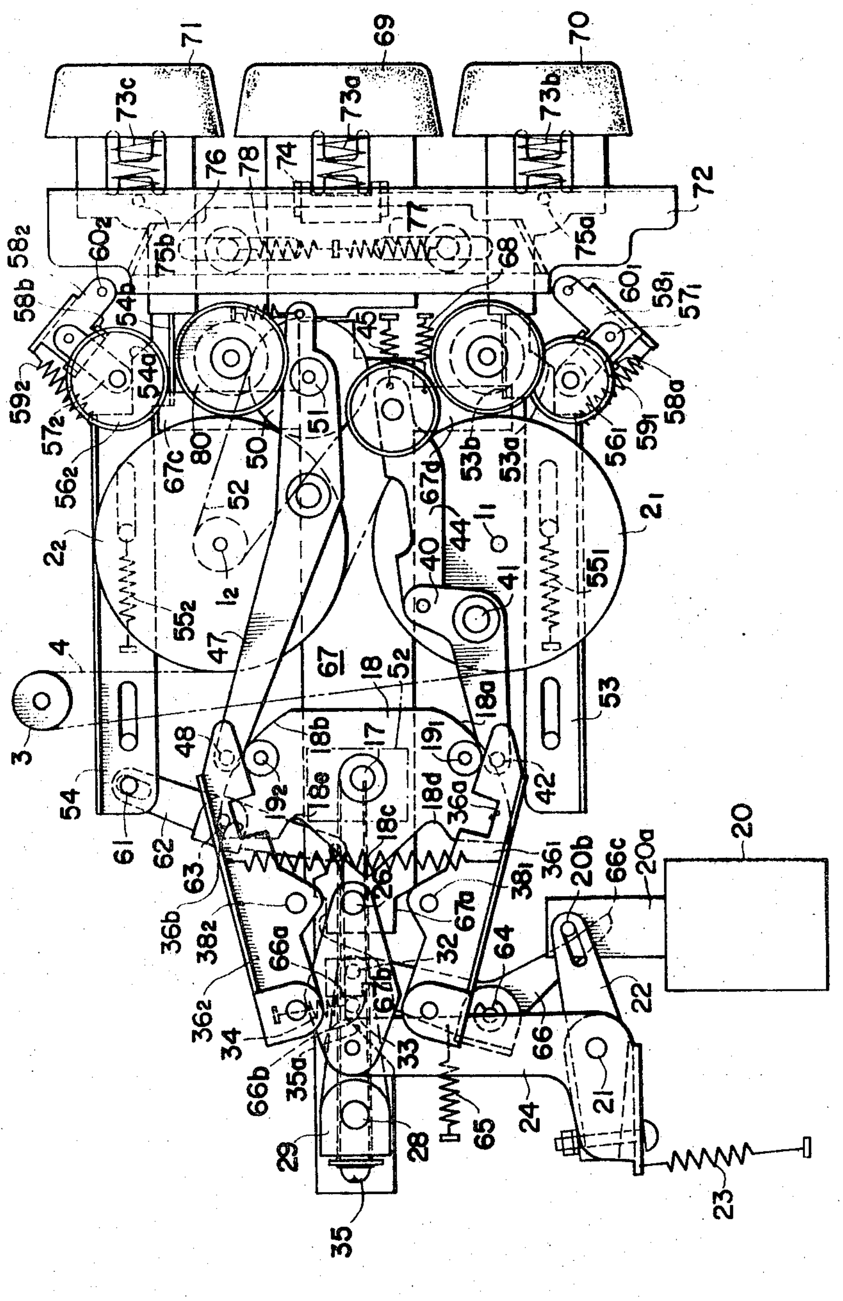
FIG. 2 is a plan view of a driving mechanism including a feeding mechanism for rewinding, shown in FIG. 1.
Figure 5:
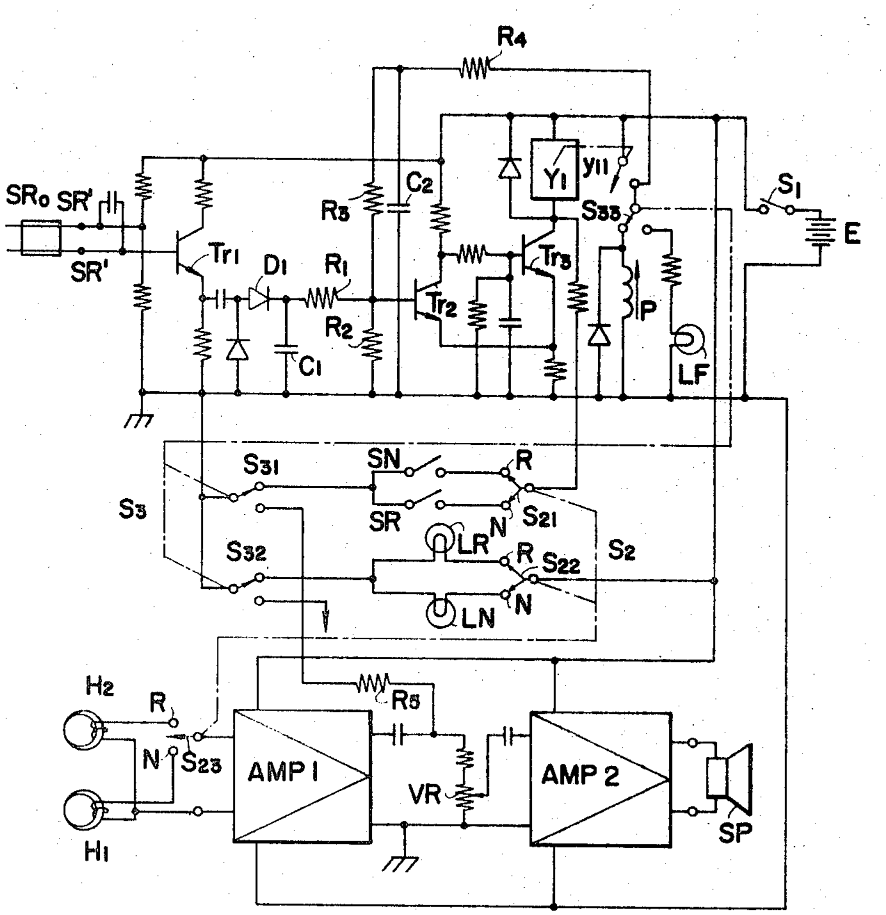
FIG. 5 shows a plunger control circuit.

In operation, the shiftable base plate 6, provided with the pinch rollers $13_1$ and $13_2$ and the magnetic head 11, as shown in FIGS. 1 and 2 in the non-operating state, is urged rearwardly by the springs 9 and is in contact with the pins $19_1$ and $19_2$ of the cam plate 18. When a tape cartridge is inserted into the apparatus in the non-operating state, the capstans $1_1$ and $1_2$, the pins $5_1$ and $5_2$ for positioning the reel shafts 81 and 82 are entered into the tape cartridge and then a switch $S_1$ which is shown in FIG. 5 is closed thereby to actuate the plunger 20.

With the actuation of the plunger 20 the lever 24 is pivoted so that the pin 26 of the cam lever 27 slides down to the valley portion 18*e* of the cam plate 18 to contact with the bottom of the valley and then to rotate the cam plate 18 around the rotation shaft 17. Simultaneously the pin $19_2$ forces the shifting base plate 6 forward and at the same time the pin $19_1$ is retracted to be separated from the shifting base plate 6 and the operation end 12*a* of the holding frame $12_1$, so that the pinch roller $13_1$ contacts with the capstan $1_1$ and the pin $19_1$ engages with the recess 36*a* of the arm $36_1$, thereby establishing a reproduction state with normal feeding. To this end, the tape is taken up from the reel shaft 82 to the reel shaft 81. When the cam plate 18 is rotated, the driving lever 47 having a pin 48 contacting with the cam surface 18*b* is rotated in clockwise around the shaft 46 and, owing to the separation of the pin 42 of the L-shaped lever 40 from the cam surface 18*a*, the lever 40 connected to the pulling lever 44 is drawn together with it by the spring 45.

Figure 3:
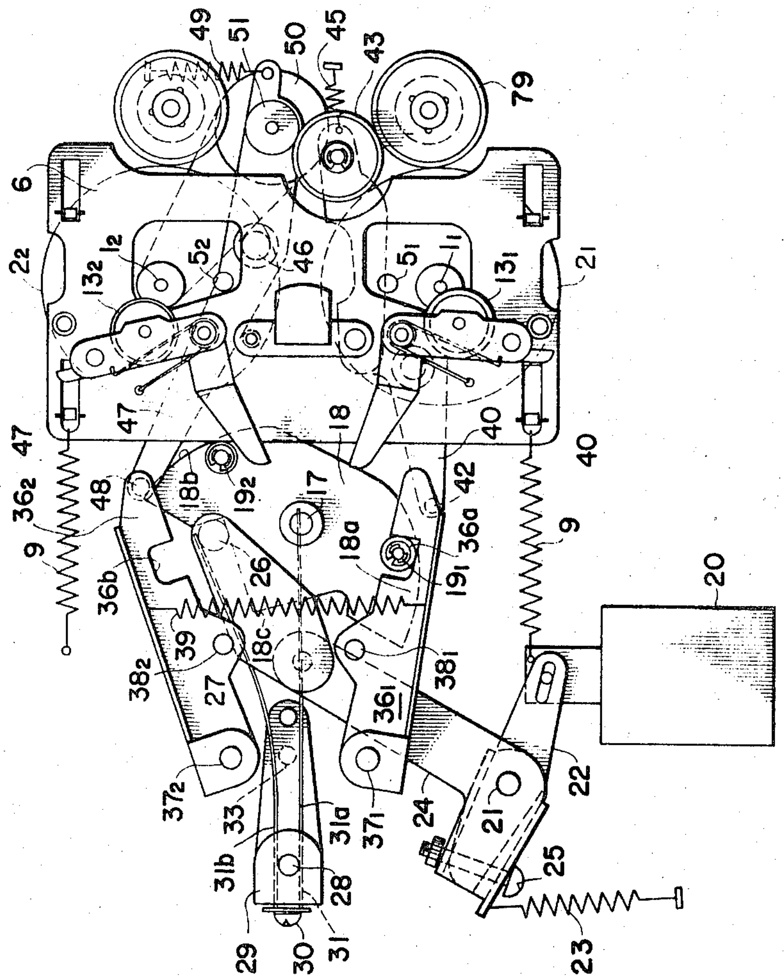
FIG. 3 is a plan view of the present apparatus in the normal feeding condition.
Figure 4:
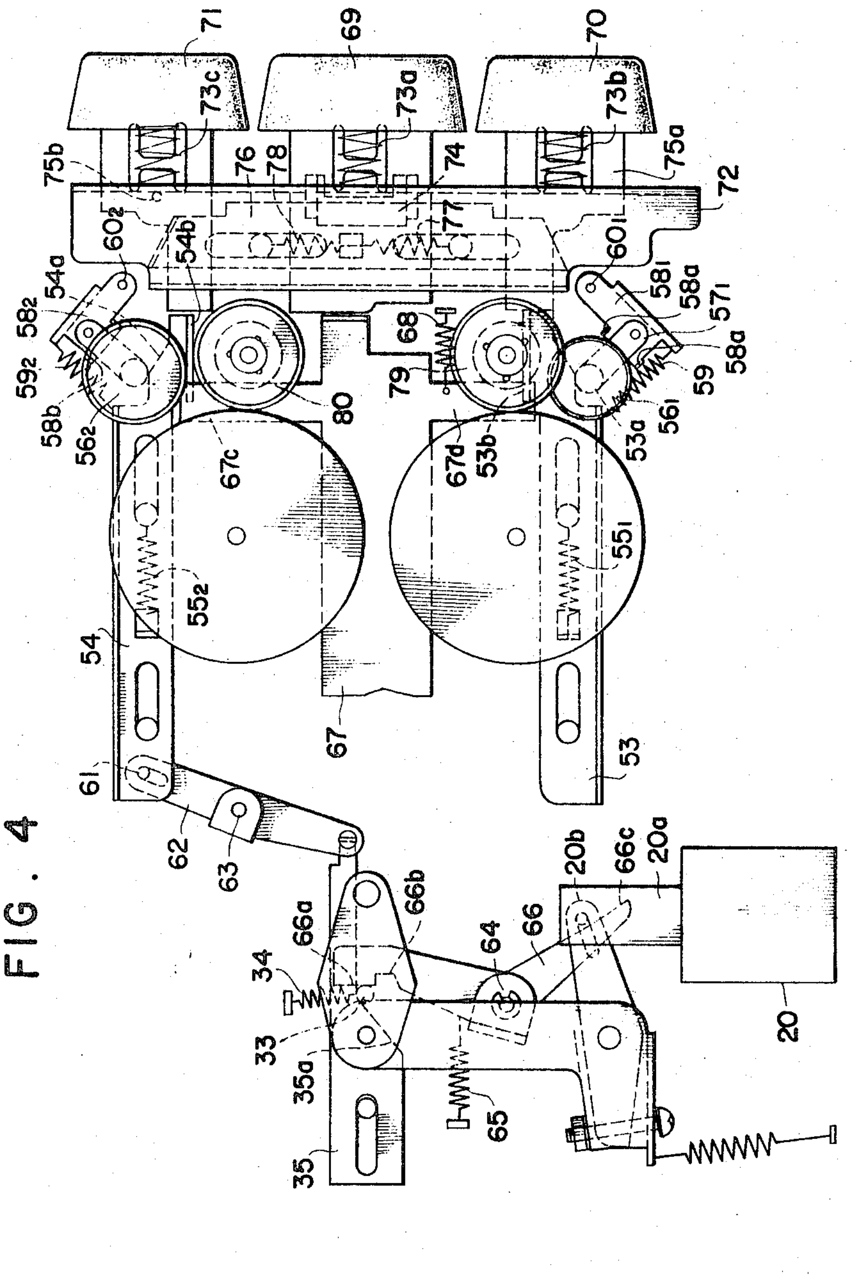
FIG. 4 is a plan view of the present apparatus in the fast feeding condition.

Thus, the rotation of the flywheel $2_2$ is transmitted through the pulley 50 and the idlers 51 and 43 to the reel stage 79 to wind up the magnetic tape as shown in FIG. 3. The other pinch roller $13_2$ does not contact with the capstan $1_2$ since the pin $19_2$ of the cam plate 18 is engaged with the operation end 12b of the holding frame $12_2$. After the pin $19_1$ of the cam plate is engaged with the recess 36*a* of the arm $36_1$, the plunger 20 is released electrically and the pin 26 of the cam lever 27, thus returned by the spring 23, is returned by the wire spring 31*b* from the state shown in FIG. 3 to that shown in FIG. 1.

When the magnetic tape is to be rewound, the reverse feeding button 71 is partially depressed, i.e., depressed up to a position, at which the idler $56_2$ does not contact with the reel stage 80 and the flywheel $2_2$, in a range that the protrusion 54*b* of the slide lever 54 does not contact with the release lever 67. With such depression of the button 71, the plunger circuit is closed to energize the plunger 20 and the preceding operation is released.

Since, when the plunger 20 is actuated, the apex 18*c* of the cam plate 18 has been rotated as shown in FIG. 3, the pin 26 of the cam lever 27 is guided by the wire spring 31 to insure that the pin 26 enters into the valley 18*d* of the cam plate. When the pin 26 is inserted in the valley 18*d* the side portion of the cam lever 27 depresses the pin $38_1$ of the arm $36_1$ to rotate the arm $36_1$ to thereby release the pin $19_1$, from the recess 36a so that the shift base plate 6 is retreated. After the feeding of the magnetic tape is stopped for a very short time by this operation, the pin 26 entered into the valley 18d rotates the cam plate 18 in a counterclockwise direction and holds it by the recess 36b of the arm $36_2$, in a similar manner to the preceding operation. At this time the pinch roller $13_1$ is retreated by the pin $19_1$ and the pinch roller $13_2$ disposed oppositely contacts with the capstan $1_2$ to pinch the tape and to feed it. The pin 48 of the driving lever 47 is also separated from the cam plate 18*b* and the idler 51 is pulled by the spring 49 to contact with the reel stage 80 so that the tape is wound up on the reel stage 80 side.

It will be clear that, by partially depressing the forward feeding button 70 to actuate the plunger 20, the tape can again be fed in the forward direction. Further, by providing a suitable detecting means for detecting the end of reproduction (or recording) of the magnetic tape on the supply reel side, the plunger 20 can be actuated upon such detection to feed the tape in the reverse direction.

When fast feeding of the magnetic tape is desirable in, for example, a direction toward the reel stage 79, the forward feeding button 70 is completely depressed. With the complete depression of the forward feeding button 70, the fast forward winding slide lever 53 is shifted rearwardly against the spring $55_1$ and the protrusion 53*b* thereof contacts with the wing portion 67*d* of the release lever 67, and thus the lever 67 comes into contact with the pin $38_1$ or $38_2$ of the arm $36_1$ or $36_2$ causing the arm $36_1$ or $36_2$ to be rotated and the pin $19_1$ or $19_2$ of the cam plate 18 to be released from the recess 36*a* or 36*b*, so that the shift base plate 6 is retreated to disengage the pinch roller and the capstan from each other. And the lever $57_1$ causes the cam portion 53*a* to shift by the action of the spring $59_1$ due to the shift of the slide lever 53 so that the idler $56_1$ engages with the fleywheel $2_1$ and the pulley 83 secured to the reel stage 79 to establish the fast forward winding condition. When the depression of the button 70 is released, the plunger 20 of the mechanism, which is at that time in the condition shown in FIG. 1, is actuated by an electrical circuit such that the pin 26 enters the valley 18*e* of the cam plate 18 to thereby perform the normal feeding operation.

In a same manner, when it is desired to wind-up the magnetic tape on the reel stage 80 side, the reverse feeding button 71 is depressed completely to retreat the slide lever 54 so that the release lever 67 releases the holding of the cam plate 18 by the arm $36_1$ or $36_2$, and at the same time the idler $56_2$ is pulled by the spring $59_2$ and engages the flywheel $2_2$, with the pulley 84 (shown by the dotted line) secured to the shaft of reel stage 80, to thereby establish the fast rewinding condition. When the slide lever 54 for the rewinding is shifted rearwardly, the connecting lever 62 engaging with the pin 61 on the slide lever 54 is rotated about the shaft 63, and the other end of the connecting lever 62 shifts the shifting lever 35 forwardly to shift the pin 33 of the spring hold lever 29 along the slope portion 35*a* and then to engage the pin 33 with the recess 66*b* of the lock lever 66. That is, the mechanism is adapted to move the magnetic tape in the same direction as that in the fast rewinding operation by the action of the plunger 20 when the reverse feeding buton 71 is released, the holding lever 29 is rotated about the shaft 28, and the pin 26 of the cam lever is pinched between the end portions 31*a* and 31*b* of the wire spring 31 which have been rotated up to a position corresponding to the valley 18*d* of the cam plate 18. Since when the plunger 20 is actuated in order to move the magnetic tape in the reverse direction, the end portion 66c of the lock lever 66 engages with the pin 20*b* of the plunger 20 to thereby rotate the plunger 20 about the shaft 64, the pin 33 is separated from the recess 66 of the lock lever 66, and the recording and/or reproducing in the reverse direction is performed whereby upon the subsequent actuation of the plunger 20 it is insured that the magnetic tape is fed in the forward direction accurately.

When it is desired to remove the tape cartridge from the present tape recorder, the eject button 69 is depressed to retreat the release lever 67 so that the engagement of the arm $36_1$ or $36_2$ with the cam plate 18 is released and the detent member 74 releases a tape cartridge holding mechanism which is not shown, whereby the cartridge can be readily removed by pulling it out.

A plunger control circuit for the previously described apparatus will be described with reference to FIG. 5. The control circuit includes a D. C. power supply E, a starting switch S1 opening in normal condition, which is closed when the tape cartridge is inserted, a sensing rotor $SR_o$ which rotates in synchronism with the reel shaft, and a pair of contacts SR′ and SR′ which contact with the sensing rotor $SR_o$ and operates repeatedly in an on-off manner upon the rotation of the sensing rotor. The circuit further includes a transistor $Tr_1$ which amplifies the on-off signal generated by the rotation of the sensing rotor $SR_o$ and circuit comprising a diode D1, a condenser $C_1$ and resistors $R_1$ and $R_2$ which rectifies the output signal from the transistor $Tr_1$ and smooths the resulting signal. Transistors $Tr_2$ and $Tr_3$, which are also included in the control circuit, constitute a Schmitt circuit together with resistors and condensers and operate such that the transistor $Tr_2$ is in ON state while the transistor $Tr_3$ is in OFF state when the sensing rotor $SR_o$ is rotated. The control circuit further includes a switching relay Y1 which is energized to switch a contact Y11 when the transistor $Tr_3$ is in ON state or when a direction switch (which will be described hereinafter) is closed.

A plunger P, which is depicted by numeral 20 in the previous description of the mechanism of the present apparatus, is provided to control the cam plate 18 and is settable at a position for the forward reproduction or the reverse reproduction. The direction of the reproduction is switched by a single movement of the plunger P, except when the fast forward winding or fast rewinding operation is performed.

A time constant circuit is included in the control circuit which is constituted with a condenser $C_2$ and resistors $R_3$ and $R_4$ and is adapted to turn on the transistor $Tr_2$ at a fixed time after the contact Y11 of the relay Y1 is closed. SN and SR mentioned above represent a direction switch for actuating the plunger P to switch the direction of the reproduction, in which when the direction switch SN is closed the plunger P is actuated to select the forward reproduction, while when the direction switch SR is closed the direction is switched to the reverse reproduction. A rotary switch S2 is engaged with the cam plate 18 and rotated therewith. When the cam plate 18 is positioned in the forward reproduction state, movable contacts S21, S22 and S23 of the rotary switch S2 contact with the contact N and, in the reverse reproduction state, contact with the contact R. On the other hand, when the reproduction is not performed, that is, when the cam plate 18 is in a neutral position, the movable contacts S21, S22 and S23 are also in neutral positions. However, the rotary switch $S_2$ is constructed in such a manner that, when the respective contacts $S_{21}$, $S_{22}$ are in neutral positions, they also contact with both the contacts N AND R. A fast feeding switch S3 is switched from the illustrated position to another position upon the tape fast feeding operation.

A movable contact S31 of the switch S3 is provided to release either of the direction switches SN and SR which, under the fast feeding, are closed, and a movable contact S32 of the same is provided to de-energize reproduction direction indicating lamps LN and LR in fast feeding and to cause a muting action, if desired. With the switching of the movable contact S31, a resistor R5 is grounded. (The above description is of the normal operation. When the stereo operation is performed, this action is also true for the movable contact S32). A movable contact S33 of the switch S3 is normally connected to the plunger P and is also connected to a lamp LF for indicating the tape end during the rapid feeding. $H_1$ and $H_2$ are reproducing heads, AMP1 and AMP2 are amplifiers, VR is a variable resistor for volume control and SP is a speaker. In this embodiment, the forward feeding button 70 and the reverse feeding button 71 for operating the direction switches SN and SR respectively are operated in a two-step manner. In the first step, the direction switches are closed to feed the tape in the selected direction and, in the second step established by further depression of them, the cam plate 18 is positioned at the neutral position and the switch S3 switches the operation so that the fast feeding is performed. The operation of the plunger control circuit thus constructed will be described.

When the reproduction is not performed, the respective contacts in the circuit are in the positions as shown in the drawing. When the starting switch S1 is closed upon the insertions of the cartridge, an electric motor for feeding the tape which is not shown is operated. At this time the transistor Tr3 of the Schmitt circuit becomes conductive so that the relay Y1 is energized and the contact y11 is closed. Upon the closure of the contact y11 the plunger P is actuated, so that the cam plate 18 is rotated and the forward reproduction state is established as previously mentioned. With this rotation of the cam plate 18 the respective movable contacts S21, S22 and S23 are switched to the contacts N. Due to the above operations, the cam plate 18 is set at the forward reproducing position and, when the tape is fed, the sensing rotor SR is rotated to make the path between the contacts SR′ on and off.

The pulse signal generated by this on-off operation of the contacts is amplified by the transistor Tr1, rectified by the rectifier circuit comprising the diode D1, the capacitor C1 and the resistors R1 and R2 etc., and applied to the base of the transistor Tr2 of the Schmitt circuit. With this input signal, the transistor Tr2 turns on and the transistor Tr3 which has been in ON state turns off. Thus the contact y11 of the relay 11 is opened and the plunger P is returned to its original position. A reproduction signal obtained at the magnetic head H as the result of the preceding operations is amplified by the amplifiers AMP1 and AMP2 and applied to the speaker to produce an acoustic output. During this operation, the reproduction direction indicating lamp LN is energized by the switching of the movable contact S22.

In order to switch manually the reproduction direction from the forward direction to the reverse direction rather than the automatic switching operation described hereinbefore, the reverse feeding button 71 is depressed and the direction switch SR is closed. That is, when the direction switch SR is closed an electric current flows in the relay Y1 via the contact N of the movable contact S21, direction switch SR and the movable contact S31, so that the contact y11 is closed to thereby actuate the plunger P. Upon the actuation of the plunger P, the cam plate 18 is switched in position from the forward reproduction state to the reverse reproduction state. Simultaneously, the rotary switch S2 is also rotated so that the respective movable contact S21, S22 and S23 contact with the contacts R and the reproduction direction indicating lamp LR is lighted. Consequently, the electric current in the relay Y1 is stopped, so that the plunger P returns to its original position even when the direction switch SR is depressed continuously. In this manner the reverse direction reproduction is completed. This operation can also be reversed.

After the reproduction of recorded signal on the end portion of the tape is completed in this manner, the feeding of the tape is stopped and thus the sensing rotor $SR_0$, being rotatable in synchronism with the reel shaft, is also stopped. Owing to this change of operation, the transistor Tr2 turns off and the transistor TR3 turns on, so that the relay Y1 is energized to close its contact y11 and to thereby actuate the plunger P. Upon the actuation of the plunger P, the reproduction direction is switched as in the same manner previously described and thus the tape is fed in reverse direction. Therefore, the sensing rotor $SR_0$ is rotated so that the transistor Tr2 in the Schmitt circuit turns on and the transistor Tr3 in the same circuit turns off, causing the plunger to be returned. In this manner the automatic inversion of the operation is performed.

Now the fast feeding operation will be described. When the forward feeding button 70 is further depressed to the second step during the reproduction in the forward direction, the direction switch SN is closed and thereafter the respective movable contacts S31, S32 and S33 are switched. Simultaneously with these switchings, the cam plate 18 returns to the neutral position as previously mentioned and at the same time the rotary switch S2 is also rotated to the neutral position. Upon the switching of the movable contact S31, the resistor R5 is grounded so that it makes a parallel circuit with the variable resistor VR for volume control to introduce the muting and thus the output level of the amplifier AMP2 is lowered to a desired level. For this reason, almost no undesirable noise is produced from the speaker SP. It will be clear that this is also true for the switch S32.

When the operator releases the forward feeding button 70 to make the button returnable from the second step after the fast feeding of the tape is completed, the switch S3 returns. Consequently, an electric current flows in the relay Y1 via the movable contact S21 in the neutral position, the contact R, the direction switch SN and the movable contact S31 and thus the plunger P is actuated. Upon this operation, the forward direction reproduction condition is established again. Further, when the button 70 is permitted to return from the first step, the direction switch SN and hence the plunger P also return.

Further, where it is desired to feed the tape fast in the reverse direction, the tape being fed in the forward direction reproduction, it is performed by depressing the reverse feeding button 71 instead of the forward feeding button 70. That is, when the reverse feeding button 71 is partially depressed, the direction switch SR is closed, so that the contact N and the direction switch SR are closed, to thereby cause an electric current to flow through the relay Y1 via the contact N, the direction switch SR and the movable contact S31 so that the plunger P is actuated. Owing to this operation, the reverse feeding condition is established as previously mentioned, and by the further depression of the button 71, the fast feeding condition in the same direction is established as previously mentioned. Upon the completion of the fast feeding operation, when the reverse feeding button 71 is released, the reverse direction reproduction is performed as previously mentioned.

When the fast feeding is continuously performed in the fast feeding condition and, to this end, the end of the tape is detected, the sensing rotor SR is stopped, so that the transistor Tr2 turns off and the transistor T33 turns on. Therefore, an electric current flows in the relay Y1, so that the relay y11 is closed and thus the indicator laMp LF is lighted via the movable contact S33. With the indicator lamp Lf lighted, the reverse feeding button 71 is released. Upon release of the button the plunger P is actuated as in the release of the forward-feeding button 70 and a reproduction condition in the same direction as that of the fast feeding is automatically established. However, since the sensing rotor SR does not rotate, the transistor Tr3 conducts continuously. Since in this case, however, the contact y11 is closed, the capacitor C2 of the time constant circuit charges gradually, and after a certain time delay the transistor Tr2 and the transistor Tr3 turn on and off, respectively, through the resistor R3, so that the plunger P returns. The returned plunger P is actuated again due to the fact that the sensing rortor SR is stopped, causing the cam plate 18 to be set at the feeding state in the direction opposite to the fast feeding direction When the sensing rotor SR is rotated in response to the tape feeding, the transistors Tr2 and Tr3 turn on and off, respectively, so that the plunger P returns. By removing the tape cartridge upon the depression of the ejection button 69, the starting switch S1 is opened and the cam plate 18 returns to the neutral position. Upon subsequent insertion of the cartridge this mechanism is ready for the forward feeding operation.

While in the preceding description, the magnetic tape recording and reproducing apparatus of the tape cartridge type is referred to, it should be noted that the present invention is not limited to such apparatus but it can be applied to other general types of magnetic tape recording and reproducing apparatus. Further, in the above description, while the detection of the end of the tape is performed by the sensing rotor, it should be noted that the detection may be performed by other suitable means such as sensing foil, etc., and further it should be noted that such control may be performed by suitable control signals other than that obtained by sensing the end of the tape.

The above described present magnetic tape recording and reproducing apparatus has various advantages and effects such as follows:

Firstly, in the present magnetic tape recording and reproducing apparatus, a single plunger is actuated in response to a sequence of operations, i.e., the closure of the starting switch, the stoppage of the sensing rotor, the closure of the direction switch and actuation of the fast feeding switch etc., in order to cause the initiation of recording or reproducing, the automatic inversion of the tape feeding direction, the switching of tape feeding direction of the recording and reproducing and the automatic returning after the release of the fast feeding, etc. Therefore the present apparatus can provide various functions with a simple mechanical construction.

Secondly, by providing a releasing means such as time constant circuit for inverting the Schmitt circuit after a predetermined time delay so that the plunger which is actuated upon the stoppage of the fast feeding operation due to the detection of the end of the tape during the fast feeding, the direction of the tape feeding is automatically reversed so that the normal recording and reproducing operations can be performed even when the tape end is detected during fast feeding.

Thirdly, since in the present apparatus, the determination of the direction of the recording or reproducing operation and the fast feeding operation are performed by a single operation button, the operation of the present apparatus is very easy with various effective functions.

Fourtly, with the extremely well disposed or arranged elements such as the switches S2 and S3 etc. and the various contacts, the overall structure of the present apparatus is very simple and provides for various certain operations.

Finally, since the present apparatus has a simple construction and is easy to operate, in addition to the above mentioned various advantages, it can provide a possibility of minimization of the overall dimensions, making it particularly useful in car stereos, which are subjected to special limitations. Furthermore, since in the present apparatus the muting becomes effective upon the selection of the rapid feeding, undesirable noise during the rapid feeding is substantially eliminated.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In a magnetic tape recording and reproducing apparatus having a cam plate which controls the direction in which the tape is fed, which cam plate is in turn controlled by an electromagnetically actuated plunger, a circuit for controlling the actuation of said plunger comprising:

means for activating the apparatus, means for detecting the end of the tape, and means for switching the tape feeding direction including a rotary switch engaged with said cam plate and rotatable therewith, said plunger being actuated in response to the energization of any of said means.

2. A magnetic tape recording and reproducing apparatus as claimed in claim 1 wherein said means for detecting the end of the tape comprise a reel shaft for the mounting of said tape and a sensing rotor rotatable in synchronism with said reel shaft.

3. A magnetic tape recording and reproducing apparatus as claimed in claim 1 wherein said plunger is actuated by means including a switching relay responsive to the output of a Schmitt circuit responsive to the output of a rectifying circuit responsive to the output of a circuit which amplifies the output of apparatus comprising a reel shaft for the mounting of said tape and a sensing rotor rotatable in synchronism with said reel shaft.

4. A magentic tape recording and reproducing apparatus as claimed in claim 1 wherein said means for activating the apparatus include a power supply and a starting switch connected to said power supply, said starting switch being open in normal condition and closed when said tape is inserted into the apparatus.

5. A magnetic tape recording and reproducing apparatus as claimed in claim 4 wherein said plunger is actuated by the insertion of said tape into the apparatus.

6. A magnetic tape recording and reproducing apparatus as claimed in claim 1 wherein said means for switching the tape feeding direction include a two-step forward feeding control button, the first step of which causes the tape to feed forward at a normal speed and the second step 4 of which causes the tape to fast-feed forward, a two-step reverse feeding control button, the first step of which causes the tape to feed in reverse at a normal speed and the second step of which causes the tape to fast feed in reverse, and means for preventing the actuation of the two feeding control bottons at the same time.

7. A magnetic tape recording and reproducing apparatus as claimed in claim 1 wherein said rotary switch has segmental contacts constructed in such a manner that, when the contacts are in neutral positions, they contact both poles of a direction switch for actuating said plunger.

8. A magnetic tape recording and reproducing apparatus as claimed in claim 1 which further includes means for indicating the direction of the tape, means for indicating the end of the tape during rapid feeding, and means for muting the volume of amplification during fast feeding.

9. A magnetic tape recording and reproducing apparatus as claimed in claim 1 which further includes:

a time constant circuit which initiates its charging in response to the energization of said means of detecting the end of the tape, whereby the direction of the tape feeding is automatically reversed after a small delay.

* * * * *